United States Patent [19]

Minami

[11] Patent Number: 5,403,791
[45] Date of Patent: Apr. 4, 1995

[54] BINDER FOR REFRACTORIES AND METHOD OF PRODUCING REFRACTORY GRANULES USING THE BINDER

[75] Inventor: Masamitsu Minami, Fukuoka, Japan

[73] Assignee: Krosaki Corporation, Fukuoka, Japan

[21] Appl. No.: 163,619

[22] Filed: Dec. 8, 1993

[30] Foreign Application Priority Data

Mar. 25, 1993 [JP] Japan .................................. 5-066983

[51] Int. Cl.$^6$ ............................................. C04B 35/54
[52] U.S. Cl. ...................................... 501/94; 501/127; 501/153; 501/154; 501/105; 525/504
[58] Field of Search ................ 523/145, 139; 525/504, 525/505, 506; 501/94, 127, 128, 105, 154, 153

[56] References Cited

U.S. PATENT DOCUMENTS

| | | | |
|---|---|---|---|
| 4,939,188 | 7/1990 | Gerber | 523/146 |
| 4,994,505 | 2/1991 | Gerber | 523/145 |
| 5,248,707 | 9/1993 | Gerber | 523/145 |
| 5,262,495 | 11/1993 | Gerber | 525/506 |
| 5,281,644 | 1/1994 | Iyer et al. | 524/259 |

FOREIGN PATENT DOCUMENTS

62-282743 12/1987 Japan .

*Primary Examiner*—Mark L. Bell
*Assistant Examiner*—A. Wright
*Attorney, Agent, or Firm*—Jordan and Hamburg

[57] ABSTRACT

Disclosed is a phenol-formaldehyde resin binder for refractories, having from 0.05 to 0.6 methylol group on average per one phenolic constitutive unit and having a free phenol content of less than 5%. For producing refractory granules with the binder, a composition comprising carbon substances of 50% by weight or less in all and a balance of refractory substances is kneaded with the binder and water optionally along with a solvent having a boiling point of 200° C. or higher, in a mixer as heated at 60° to 130° C. Optionally, the volatile content in the blended mix is adjusted to the shapable level. The process of using the binder is free from injury to human bodies and the danger of firing. The refractory granules may be shaped into refractory articles having a suitable gas-permeability stable against variation of the working environment. The refractory granules are suitable for shaping gas-blowing immersion nozzles having a suitable gas-permeability.

10 Claims, 3 Drawing Sheets

FIG. 1

1 DIFFERENTIAL MOLECULAR WEIGHT DISTRIBUTION CURVE
2 INTEGRAL MOLECULAR WEIGHT DISTRIBUTION CURVE

FIG. 2

1 DIFFERENTIAL MOLECULAR WEIGHT DISTRIBUTION CURVE
2 INTEGRAL MOLECULAR WEIGHT DISTRIBUTION CURVE

FIG. 3

1 DIFFERENTIAL MOLECULAR WEIGHT DISTRIBUTION CURVE
2 INTEGRAL MOLECULAR WEIGHT DISTRIBUTION CURVE

BINDER FOR REFRACTORIES AND METHOD OF PRODUCING REFRACTORY GRANULES USING THE BINDER

FIELD OF THE INVENTION

The present invention relates to a binder for shaping refractories, especially to a binder suitable for production of refractory parts which require spalling resistance, corrosion resistance, airtightness and high mechanical strength, for example, nozzles for continuous casting of high-quality steels, such as sliding nozzle plates, long nozzles, immersion nozzles and the like for flow rate control between the ladle and tundish or between the tundish and mold, and gas permeating parts for argon gas-blowing immersion nozzles for continuous casting, i.e., gas bubbling parts; and it also relates to a method of producing the above-mentioned refractories using the binder.

BACKGROUND OF THE INVENTION

A refractory constituting an immersion nozzle for injection of a molten material from a tundish to a mold in continuous casting requires spalling resistance, corrosion resistance, airtightness and high mechanical strength to be sufficiently resistant to great mechanical loads and shock, as are generated by molten steel flow or by mechanical vibration during casting operations.

In order to satisfy these requirements, alumina with excellent corrosion resistance to molten steel and graphite-combined oxide-carbon composite refractories, such as alumina graphite or zirconia-graphite composites, which have excellent corrosion resistance to slug, high thermal conductivity and excellent spalling resistance, have heretofore been employed widely.

In order to improve the mechanical strength of the refractories, there is known a method of granulating surface-wetted refractory aggregates with a binder comprising a low boiling point alcohol solvent and a semi-molten phenol resin followed by shaping the resulting granules to form a shaped body with enlarging the intergranular bonding force of the refractory aggregate granules during shaping.

However, excess addition of the low boiling point solvent to the binder causes easy cracking of the shaped body. Therefore, production of the binder requires a drying step to control the content of the low boiling point solvent in the binder within a suitable range. The vaporization of the low boiling point solvent in the drying step is a waste of natural resources, and the vaporized gas generated during production of the binder or during the drying step is harmful to humans and involves the danger of fire.

In addition, as an important factor when an immersion nozzle is used, especially in production of high-cleaned steel articles, the amount of argon gas to be blown into the mold from the gas-introducing hole of the nozzle must be uniform and the dispersion of the argon gas to be blown thereinto must be within a narrow range.

The gas permeability of the gas-blowing immersion nozzle is noticeably influenced by the variation of the plasticity of it to be derived from the binder in the molding composition due to fluctuation of the ambient temperature and humidity during the course of the process of blending the constitutive components, kneading them and shaping the kneaded blend composition to the nozzle.

For instance, where an ordinary phenolic resin is used as a binder for shaping a refractory, the refractory can easily be tightened during the shaping of it when the ambient temperature and humidity during shaping are high enough that the tissue of the shaped refractory densifies, therefore lowering the porosity and the gas permeability of the shaped refractory. As a result, the diameter of the bubbles to be blown into molten steel shaped from the refractory become small enough that the floating of the blown bubbles in the mold is insufficient to cause defects in the shaped steel body. On the contrary, where the ambient temperature and humidity are low, the tissue of the shaped refractory is loosened to elevate its porosity, and therefore the gas permeability of the shaped refractory is raised. As a result, the diameter of the bubbles to be blown into the molten metal would be so large that the bubbles would trap the non-metallic impurities in the mold, resulting in the floating force of the bubbles becoming insufficient.

In general, in bubbling with a gas-permeable body of an immersion nozzle, there is a suitable gas permeation range. For instance, it is said that a gas permeation range at room temperature under the condition of a back pressure of 1 $kg/cm^2$ is expressed to be from 30 to 40 Nl/min. Using conventional refractories as produced with an ordinary phenolic resin, it is difficult to attain the suitable gas permeation range.

SUMMARY OF THE INVENTION

One object of the present invention is to provide a binder for refractories, which is not harmful to humans and which does not risk a fire caused by vaporization of the free phenol to be contained in the phenolic resin binder to be used in production of a granular composition for refractories and by vaporization of a low boiling point solvent (for example, lower alcohols) to be used in kneading the components for the granular composition.

Another object of the present invention is to provide a binder for producing a gas-blowing immersion nozzle which is free from fluctuation of gas permeability due to variation of the working environment, and free of the time-dependent shaping characteristics, thereby always having suitable gas permeability.

Still another object of the present invention is to provide a kneaded granular composition for shaping a gas-blowing immersion nozzle which is free from fluctuation of gas permeability due to variation of the working environment, and free of the time-dependent shaping characteristics, thereby always having suitable gas permeability.

In order to attain these objects, the present invention provides a phenol-formaldehyde resin binder for refractories having from 0.05 to 0.6 methylol group on average per one phenol constitutive unit nucleus. As the methylol group content in the resin is much smaller than that of conventional resols having from 1 to 3 methylol groups per one phenolic unit, the hardening speed of the resin is extremely slow. Before hardening, the resin binder contains a polymer having a mean molecular weight of 10,000 or more and the free phenol content is less than 5%. For hardening, the resin binder does not need a hardening agent. The resin may be kneaded with a low boiling point solvent (for example, lower alcohols such as ethanol) by one conventional method generally employed in this technical field, or alternatively, it may also be kneaded with water under heat to give a plasticized and semi-molten mix displaying a function as a binder. The present invention is based on the findings.

As one embodiment of producing refractory granules with the binder of the present invention, a composition comprising carbon substances of 50% by weight or less in all and a balance of refractory substances is kneaded with a composition comprising the phenol-formaldehyde resin binder of the invention and water and, optionally, a solvent having a boiling point of 200° C. or higher, in a mixer heated at 60° to 130° C. Optionally, the volatile content in the blended mix is adjusted to the shapable level.

DETAILED DESCRIPTION OF THE INVENTION

A phenolic resin may be grouped into a self-hardening resol resin and a novolak resin needing a hardening agent.

Both are called a so-called conventional phenolic resin substantially not containing a polymer having a molecular weight of 10,000 or more with respect to the molecular weight distribution curve. The former generally contains a hydrophilic free phenol moiety to be a factor for elevating the moisture-absorbing property in a content of about 10% and excess methylol groups (—CH$_2$OH). The latter novolak resin requires a hardening agent (hexamethylenetetramine) and this also has a high moisture-absorbing capacity. On the other hand, a high molecular resol containing a polymer having a molecular weight of 10,000 or more also contains excess methylol groups, and analogously a high molecular novolak needs a hardening agent.

As opposed to these, the high molecular phenol to be employed in the present invention has from 0.05 to 0.6 methylol group on average per one constitutive phenolic unit and is a high molecular system containing a polymer having a molecular weight of 10,000 or more, though it is self-hardening. Therefore, it is a plastic resin, the plasticity of which hardly varies due to variation of the ambient temperature.

With respect to the moisture-absorbing property, the free phenol content is desirably in the lowest possible level. As an example of a high molecular phenol of the type, there is mentioned Bell pearl S (produced by Kanebo Co.).

With respect to the volatile content necessary for shaping such a gas-permeable article, the time-dependent variation of the content due to the ambient condition should be as small as possible. For this, a solvent having a low moisture-absorbing capacity and a high boiling point (200° C. or higher) is added to the resin, which may be a suitable volatile content as remaining therein.

A high boiling point solvent is also added to the resin as a suitable volatile content therein for the purpose of adjusting the volatile content in the refractory composition in blending the constitutive components in a mixer, for the same reason as above.

The present inventors noted a self-hardening high molecular phenol having a low moisture-absorbing capacity and containing a polymer having a molecular weight of 10,000 or more, and investigated a clean process for aqueous granulation from water and a high molecular phenol, which is almost completely free from the danger of fire and the toxicity due to a free phenol and a low boiling point solvent in kneading the refractory components, in consideration of reduction of the time-dependent variation of the moisture-absorbing capacity and the plasticity of the phenolic resin.

As a result, the refractories as obtained after the above-mentioned investigation were found to be highly improved with respect to the reduced dispersion of the gas permeability of the gas-permeable part of an immersion nozzle as compared with those obtained by a known technique. For improvement of the dispersion of the gas permeability of the refractory article, the kind of solvent to be used, aqueous or non-aqueous, is not defined.

As a novel kneading method for producing a refractory composition, a process causing less environmental pollution than a conventional process has been developed by the present invention. On the basis of the novel kneading process, an epoch-making process of adjusting the volatile content in the refractory composition in a mixer has also been developed. On the basis of this development, the present invention has been completed.

As examples of the high boiling point solvent for use in the present invention, mentioned are phthalates such as DBP (dibutyl phthalate) and DOP (dioctyl phthalate).

The preferable substances for the refractory composition of the present invention are natural or artificial graphite, coke, mesophase carbon, isotropic carbon and carbon black, which have the highest possible purity. If the carbon content in the composition is less than 5% by weight, the shaped article from it would have unsatisfactory spalling resistance and resistance to penetration of slugs thereinto. If it is more than 50% by weight, the strength of the shaped article would be low and the operability of producing shaped articles from the composition would be unsatisfactory.

As the refractory aggregates for the balance of the refractory composition, alumina is satisfactory with respect to the high mechanical strength and the high corrosion resistance to molten steel. Silica is generally added as a molten silica. Since silica is not very expansive, addition of it to the refractory composition is recommended to improve the spalling resistance of the shaped refractory article. Spinel ($Al_2O_3$—MgO) has high corrosion resistance to slug. Zirconia and other basic substances such as CaO and MgO have excellent slug resistance and powdering resistance. All of them may be employed as the refractory aggregates.

The binder of the present invention is added to refractory aggregates comprising 50% by weight or less, as a whole, of the carbonaceous material and a balance of the refractory material containing one or more of $Al_2O_3$, $SiO_2$, $ZrO_2$, CaO and MgO. The resulting blend is then kneaded along with a low boiling point solvent in a mixer without heating for granulation. Alternatively, it is kneaded along with water in a mixer under heat at 60° to 130° C. also for granulation. After the granulation, refractory granules suitable for shaping a gas blowing nozzle are obtained.

Mixers of some kind may heat the refractory blend for granulation up to 60° C. or higher due to the frictional heat during the granulation, depending upon their mechanism. It is desirable, however, to heat the refractory blend in a mixer up to a temperature range of 60° C. to 130° C. by external forced heating during granulation of the blend.

For controlling the volatile content in the granules as prepared by the use of the binder of the present invention in the manner mentioned above, the granules are rotated in the mixer at a sufficiently low rotation speed so that the granules are not broken by the rotation, whereby water, except the suitable volatile content, is removed by evaporation. In this step, the mixer should be heated up to a temperature range of 60° to 130° C.

Where the granulation is effected with water, the water is not trapped in the binder, unlike the low boiling point solvent, so that the resulting granules dry with ease.

Therefore, the addition of a high boiling point solvent which has a low moisture-absorbing capacity and has a boiling point of at least 200° C. or higher, such as ester solvents of, for example, DBP (dibutyl phthalate), DOP (dioctyl phthalate) or the like, is necessary as a suitable volatile content. Because of the quick drying property of the granules, water may be evaporated almost completely from the granules with the high boiling point solvent remaining in them as a suitable volatile content, and the step of drying the granules may be omitted.

A phenolic resin is grouped into a self-hardening resol type and a novolak type of needing a hardening agent. In the prior art, a so-called conventional phenolic resin not containing a polymer having a molecular weight of 10,000 or more in the molecular weight distribution curve has been generally used.

The conventional resol type resin has from 1 to 3 methylol groups per one phenolic unit; while the binder of the present invention comprises a high molecular phenolic resin having from 0.05 to 0.6 methylol group on average per one phenolic unit. Using the binder of the present invention, therefore, time-dependent variation of the moisture-absorbing level of the refractory granules due to the variation of the ambient temperature during the period of from kneading the constitutive components to shaping the kneaded refractory composition as well as time-dependent variation of the plasticity of the binder in the composition due to the variation of the ambient temperature during the same may noticeably be reduced.

Regarding the conventional phenolic resin binder, both the resol type resin and the novolak type resin cause partial hardening of the binder when kneaded with water under heat. This is because even a high molecular resol resin comprising a polymer having a molecular weight of 10,000 or more hardens rapidly as it contains excess methylol groups therein. Analogously, even in a high molecular novolak resin which needs a hardening agent, the existing hardening agent partially hardens during the step of granulation so that the binder function of wetting the aggregates lessens and therefore the strength of the fired article noticeably lessens.

The present invention uses the above-mentioned high molecular phenolic resin having excellent heat stability as mentioned above as a binder, so that granulation of the refractory composition into granules with water is possible.

Granulation of a refractory composition containing the binder of the present invention with water into refractory granules is naturally different from that done with a solvent in that the phenolic resin binder is not dissolved during granulation. That is to say, water in the composition as heated in the mixer does not dissolve the binder of the present invention but plays the role of effectively transmitting the heat from the mixer to the resin binder, being in contact with the resin binder, so that uniform plasticization of the high molecular phenolic resin is thereby promoted. The thus uniformly plasticized phenolic resin may wet the refractory aggregates in the composition so that it displays a function as a binder for granulation of the composition.

The resin binder of the present invention has a free phenol content of less than 5%. This is because, if it is more than the limited range, the free phenol moiety which is a so-called low boiling point component and which is hydrophilic causes time-dependent variation of the property (or variation of the plasticity) of the binder in the composition being shaped due to its absorption of water and, as a result, high-yield granulation of the refractory composition to provide granules capable of being shaped into a gas-permeable article having a strictly controlled gas permeability becomes impossible.

Where the refractory composition containing the binder of the present invention is granulated with water, water is not virtually trapped in the phenolic resin binder, so the drying speed of the resulting granules is extremely high as compared with the granules formed with an alcohol solvent of dissolved phenolic resin. Because of the quick drying property of the granules, the granules are preferably heated in a mixer at 60° C. or higher while rotating the mixer at a sufficiently low rotation to avoid breaking the granules, whereby all water except the suitable volatile content is removed by vaporization.

Because of the quick drying property of the granules, a high boiling point (200° C. or higher) solvent having a low moisture-absorbing capacity may be added thereto as a suitable volatile content, and water may be completely evaporated with the high boiling point solvent remaining in the granules as a suitable volatile content due to the quick drying property of the granules. Accordingly, the step of drying the granules may be omitted, creating an epoch-making technique of producing refractory granules.

As a result, the quality of the refractories to be obtained by the novel kneading process of aqueous granulation of a refractory composition optionally with the applied technology of controlling the volatile content in the granules during treatment in a mixer is in a level comparable to or higher than the level of the refractories to be produced by the prior art technique. From the refractory granules thus produced by the present invention, gas-permeable refractory articles having a strictly controlled gas permeability may be shaped with high yield.

Since the binder of the present invention contains an extremely small content of reactive functional groups such as methylol group, generation of gas due to chemical reaction in firing a refractory article containing the binder is needless to say gentle. If the binder has a free phenol content of 5% or more, however, a large amount of gas would be generated rapidly from the low boiling point component in firing. In this case, the yield of large-size and thick-wall casting nozzles from the refractory granules is low. Using the binder of the present invention, a subsidiary effect of improving the yield of nozzle bodies from the refractory granules may be attained. The free phenol as referred to herein is one to be generated in the process of producing the phenolic resin binder but is not one to be added to the refractory composition in preparing it separately from the resin binder.

The present invention will be explained in more detail by way of the following examples, which, however, are not intended to restrict the scope of the present invention.

EXAMPLES AND COMPARATIVE EXAMPLES

Tables 1 and 2 below show examples demonstrating the binder of the present invention as applied to the manufacture of a gas-permeable part of a casting nozzle, along with comparative examples.

TABLE 1

|  | Comp. Ex. 1 | Comp. Ex. 2 | Comp. Ex. 3 | Comp. Ex. 4 | Comp. Ex. 5 | Comp. Ex. 6 | Comp. Ex. 7 | Ex. 1 | Ex. 2 | Ex. 3 | Comp. Ex. 8 | Ex. 4 |
|---|---|---|---|---|---|---|---|---|---|---|---|---|
| ○ Refractory Components (wt. %) | | | | | | | | | | | | |
| Grains of Alumina | 49 | 49 | 49 | 49 | 9 | 49 | 49 | 49 | 24 | 49 | 44 | 44 |
| Fine Grains of Silicon Carbide | 5 | 5 | 5 | 5 | 5 | 5 | 5 | 5 | 5 | 5 | 5 | 5 |
| Fine Grains of Silicon | 1 | 1 | 1 | 1 | 1 | 1 | 1 | 1 | 1 | 1 | 1 | 1 |
| Fine Grains of Zirconia Mullite | — | — | — | — | — | — | — | — | — | — | — | — |
| Fine Grains of Spinel | — | — | — | — | — | — | — | — | — | — | — | — |
| Fine Grains of CaO-Stabilized Zirconia | — | — | — | — | — | — | — | — | — | — | — | — |
| Fine Grains of Calcium Zirconate | — | — | — | — | — | — | — | — | — | — | — | — |
| Fine Grains of Molten Silica | 25 | 25 | 25 | 25 | 25 | 25 | 25 | 25 | 25 | 25 | — | — |
| Natural Flaky Graphite | 20 | 20 | 20 | 20 | 60 | 20 | 20 | 20 | 45 | 20 | 20 | 20 |
| Content of Phenolic Resin (wt. %) | +11 | 11 | +11 | +11 | +11 | +11 | +11 | +11 | +11 | +11 | +9 | +9 |
| ○ Characteristics of Phenolic Resin | | | | | | | | | | | | |
| Kind of Phenolic Resin(*1) | A | B | C | D | D | D | D | D | D | D | A | D |
| Number of Methylol Groups (n/phenolic unit) | 0.02 | 0.02 | 2.0 | 0.25 | 0.25 | 0.03 | 0.8 | 0.25 | 0.25 | 0.25 | 0.02 | 0.25 |
| Free Phenol (wt. %) | 3.0 | 0.1 | 10.0 | 6.0 | <0.1 | <0.1 | <0.1 | <0.1 | <0.1 | <0.1 | 3.0 | <0.1 |
| Use of Hardening Agent | Yes | Yes | No | No | No | No | No | No | No | No | Yes | No |
| Kind of Solvent Used in Kneading Granulation(*2) | A | A | A | A | A | A | A | A | A | B | A | A |
| Quality of Fired Article | | | | | | | | | | | | |
| Bulk Density | 2.26 | 2.20 | 2.23 | 2.18 | 2.00 | 2.05 | 2.24 | 2.19 | 2.02 | 2.17 | 2.42 | 2.40 |
| Apparent Porosity (%) | 18.5 | 19.5 | 18.9 | 19.7 | 15.0 | 25.1 | 18.7 | 19.3 | 17.0 | 19.5 | 19.3 | 19.8 |
| Bending Strength at Room Temperature (kg/cm$^2$) | 64 | 65 | 65 | 68 | 38 | 32 | 62 | 68 | 63 | 64 | 68 | 64 |
| Hot Bending Strength at 1400° C. (kg/cm$^2$) | 60 | 60 | 64 | 62 | 37 | 30 | 58 | 65 | 58 | 60 | 63 | 58 |
| Spalling Test(*3) | Not cracked | Not cracked | Not cracked | Not cracked | Not cracked | Cracked greatly | Not cracked | Not cracked | Not cracked | Not cracked | Not cracked | Not cracked |
| Melt Loss Index(*4) | 100 | 100 | 100 | 90 | 200 | 150 | 100 | 90 | 120 | 90 | 80 | 80 |
| Aeration Stability(*5) | X | X | X | Δ | X | X | Δ | ○ | ○ | ○ | X | ○ |

(*1)A: Ordinary novolak, B: High molecular novolak, C: ordinary resol, D: Self-hardening high molecular phenol
(*2)A: Non-aqueous solvent (lower alcohols such as ethanol), B: water ($H_2O$)
(*3)A sample of a determined shape was dipped in molten iron of 1600° C. for 90 seconds and then cooled for 20 seconds, whereupon the condition of the sample was observed with respect to cracks, if any.
(*4)2.5 kg of electrolytic iron and 62.5 g of the slug ($CaO/SiO_2 = 2$) were dipped in molten steel of 1600° C. for 60 minutes, whereupon the reduction of the dimension of the slug/metal interface was measured. The measured value was represented as an index based on the value of Comparative Example 1 of being 100.
(*5)○: 90% or more of the tested samples were within the acceptable gas-permeable range (30 to 40 NL/min) as the yield standard.
Δ: 60% or less of the tested samples were within the acceptable gas-permeable range (30 to 40 NL/min) as the yield standard.
X: 40% or less of the tested samples were within the acceptable gas-permeable range (30 to 40 NL/min) as the yield standard.

TABLE 2

|  | Comp. Ex. 9 | Ex. 5 | Comp. Ex. 10 | Ex. 6 | Comp. Ex. 11 | Ex. 7 | Comp. Ex. 12 | Ex. 8 | Ex. 9 |
|---|---|---|---|---|---|---|---|---|---|
| ○ Refractory Components (wt. %) | | | | | | | | | |
| Grains of Alumina | 44 | 44 | — | — | — | — | 67 | 67 | 67 |

TABLE 2-continued

|  | Comp. Ex. 9 | Ex. 5 | Comp. Ex. 10 | Ex. 6 | Comp. Ex. 11 | Ex. 7 | Comp. Ex. 12 | Ex. 8 | Ex. 9 |
| --- | --- | --- | --- | --- | --- | --- | --- | --- | --- |
| Fine Grains of Silicon Carbide | 5 | 5 | — | — | — | — | 4 | 4 | 4 |
| Fine Grains of Silicon | 1 | 1 | — | — | — | — | 1 | 1 | 1 |
| Fine Grains of Zirconia Mullite | — | — | — | — | — | — | — | — | — |
| Fine Grains of Spinel | 30 | 30 | — | — | — | — | — | — | — |
| Fine Grains of CaO-Stabilized Zirconia | — | — | 75 | 75 | — | — | — | — | — |
| Fine Grains of Calcium Zirconate | — | — | — | — | 75 | 75 | — | — | — |
| Fine Grains of Molten Silica | — | — | — | — | — | — | — | — | — |
| Natural Flaky Graphite | 20 | 20 | 25 | 25 | 25 | 25 | 28 | 28 | 28 |
| Content of Phenolic Resin (wt. %) | +10 | +10 | +7 | +7 | +8 | +8 | +9 | +9 | +9 |
| ○ Characteristics of Phenolic Resin |  |  |  |  |  |  |  |  |  |
| Kind of Phenolic Resin(*1) | A | D | A | D | A | D | A | D | D |
| Number of Methylol Groups (n/phenolic unit) | 0.02 | 0.25 | 0.02 | 0.25 | 0.02 | 0.25 | 0.02 | 0.25 | 0.25 |
| Free Phenol (wt. %) | 3.0 | <0.1 | 3.0 | <0.1 | 3.0 | <0.1 | 3.0 | <0.1 | <0.1 |
| Use of Hardening Agent | Yes | No | No | No | No | No | No | No | No |
| Kind of Solvent Used in Kneading Granulation(*2) | A | A | A | A | A | A | A | A | B |
| Quality of Fired Article | I |  |  |  |  |  |  |  |  |
| Bulk Density | 2.38 | 2.36 | 3.20 | 3.18 | 2.85 | 2.80 | 2.44 | 2.44 | 2.42 |
| Apparent Porosity (%) | 18.7 | 19.6 | 18.2 | 18.4 | 18.0 | 18.5 | 17.4 | 17.6 | 18.0 |
| Bending Strength at Room Temperature (kg/cm$^2$) | 63 | 65 | 58 | 59 | 50 | 53 | 56 | 54 | 54 |
| Hot Bending Strength at 1400° C. (kg/cm$^2$) | 65 | 60 | 52 | 54 | 42 | 45 | 58 | 56 | 56 |
| Spalling Test(*3) | Not cracked | Not cracked | Not cracked | Not cracked | Not cracked | Not cracked | Not cracked | Not cracked | Not cracked |
| Melt Loss Index(*4) | 50 | 50 | 30 | 30 | 140 | 140 | 60 | 60 | 56 |
| Aeration Stability(*5) | X | ○ | X | ○ | X | ○ | X | ○ | ○ |

(*1)A: Ordinary novolak, B: High molecular novolak, C: ordinary resol, D: Self-hardening high molecular phenol
(*2)A: Non-aqueous solvent (lower alcohols such as ethanol), B: water ($H_2O$)
(*3)A sample of a determined shape was dipped in molten iron of 1600° C. for 90 seconds and then cooled for 20 seconds, whereupon the condition of the sample was observed with respect to cracks, if any.
(*4)2.5 kg of electrolytic iron and 62.5 g of the slug ($CaO/SiO_2$ = 2) were dipped in molten steel of 1600° C. for 60 minutes, whereupon the reduction of the dimension of the slug/metal interface was measured. The measured value was represented as an index based on the value of Comparative Example 1 of being 100.
(*5)○: 90% or more of the tested samples were within the acceptable gas-permeable range (30 to 40 NL/min) as the yield standard.
Δ: 60% or less of the tested samples were within the acceptable gas-permeable range (30 to 40 NL/min) as the yield standard.
X: 40% or less of the tested samples were within the acceptable gas-permeable range (30 to 40 NL/min) as the yield standard.

An ordinary phenolic resin of a prior art or a high molecular phenolic resin of the present invention was added as a binder to the refractory composition comprising the components shown in Tables 1 and 2 above to prepare shaping compositions. Each of the compositions was shaped with an isostatic press, dried and then fired to obtain an immersion nozzle.

Comparative Example 1 demonstrates formation of a gas-permeable article, using an ordinary novolak phenolic resin by a prior art. The articles formed do not satisfy the acceptable gas-permeable range (30 to 40 NL/min).

Comparative Example 2 employed a high molecular novolak resin which needs a hardening agent. The articles formed do not satisfy the acceptable gas-permeable range (30 to 40 NL/min).

Comparative Example 3 employed an ordinary resol type novolak resin in accordance with a prior art. The articles formed also do not satisfy the acceptable gas-permeable range.

Comparative Example 4 employed a high molecular phenolic resin, in which the number of the methylol groups was within the claimed range but the free phenol content was 6% and is outside the claimed range. Since the free phenol content in the binder resin was high, the yield of the shaped articles was low and the articles formed do not satisfy the acceptable gas-permeable range.

Comparative Example 5 employed a refractory composition having a total carbonaceous material content of more than 50% by weight. The articles formed could not be put to practical use.

Comparative Example 6 employed a binder resin in which the number of the methylol groups is 0.03 per one phenolic unit and is outside the claimed range. As the hardening range of the composition was extremely low and hardening of the composition was insufficient, the hardened articles had low mechanical strength and were highly porous, and they do not satisfy the acceptable gas-permeable range.

Comparative Example 7 employed a binder resin in which the number of the methylol groups was 0.8 per one phenolic unit and was outside the claimed range. The property of the composition varied with the lapse of time. The yield of the shaped articles was low and the articles formed do not satisfy the acceptable gas-permeable range.

Comparative Example 8 employed an alumina/zirconia mullite/carbon composition; Comparative Example 9 employed an alumina/spinel/carbon composition; Comparative Example 10 employed a zirconia/carbon composition; Comparative Example 11 employed a zirconia/lime/carbon composition; and Comparative Example 12 employed an alumina/carbon (not containing $SiO_2$) composition. All of them were shaped by a prior art. None the shaped articles satisfy the acceptable gas-permeable range.

Examples 1 to 3 demonstrate formation of gas-permeable articles from an alumina/carbon composition (containing $SiO_2$) along with a high molecular phenolic resin of the present invention. Unlike those of Comparative Examples 1 to 7, all the shaped articles satisfy the acceptable gas-permeable range. Examples 1 to 3 thus support the effect of the binder resin of the present invention.

In Examples 3 and 9, water was used in granulation of the composition, in place of a solvent, while heating the mixer so as to plasticize the binder used, in accordance with the novel kneading process of the present invention. These verify the fact that the kind of solvent to be applied to the binder of the present invention is not specifically defined for obtaining a gas-permeable article having a satisfactory gas-permeability.

A gas-permeable immersion nozzle as produced in Example 1 was actually used in a plant having a 130-ton pan, in O Factory of A Steelworks Co. It was verified that the nozzle of Example 1 could be used quite as well as the ordinary nozzles currently used in the plant.

Measurement of the average molecular weight of the binder samples in the previous examples and comparative examples was effected by gas chromatography based on polystyrene, and the molecular weight distribution curve was obtained from the measured values.

Figure 1:
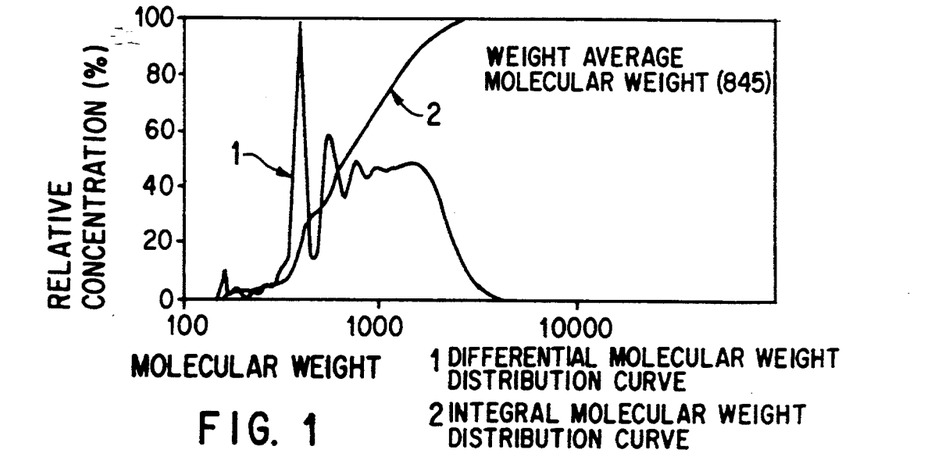
FIG. 1 is a graph showing the molecular weight distribution curve of a conventional novolak phenol not containing a polymer and having a molecular weight of 10,000 or more with respect to the molecular weight distribution, the phenol needing a hardening agent.
Figure 2:
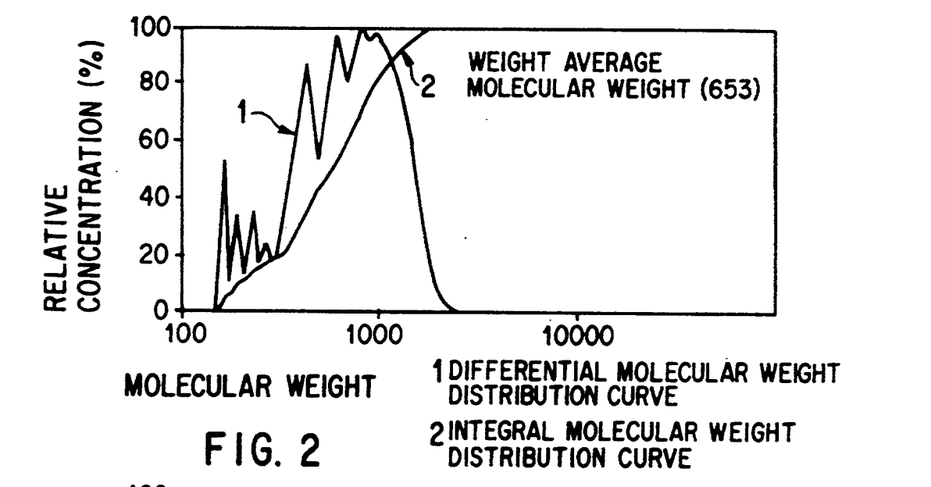
FIG. 2 is a graph showing the molecular weight distribution curve of a conventional resol type phenol not containing a polymer having a molecular weight of 10,000 or more with respect to the molecular weight distribution, the phenol containing from 1 to 3 methylol groups on average per one phenolic unit.
Figure 3:
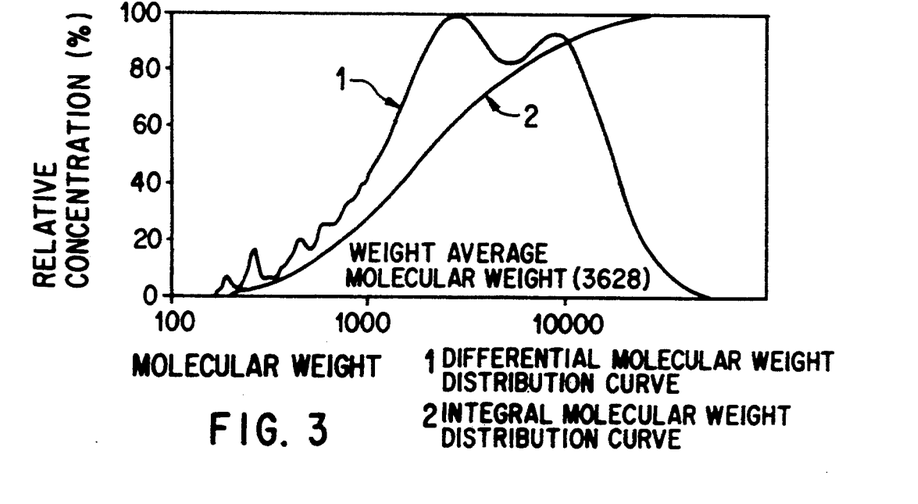
FIG. 3 is a graph showing the molecular weight distribution curve of a high polymer phenol of the embodiment of the present invention containing a polymer having a molecular weight of 10,000 or more with respect to the molecular weight distribution and having from 0.05 to 0.6 methylol group on average per one phenolic unit, the phenol not needing a hardening resin.
Figure 4:
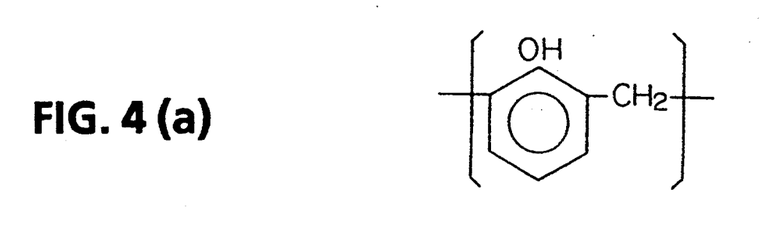
FIG. 4(a) shows the chemical structure of one constitutive unit of a phenol resin.
FIG. 4(b) shows the chemical structure of a conventional resol having from 1 to, at most, 3 methylol groups as bonded to one phenolic unit.
FIG. 4(c) shows the chemical structure of a conventional resol having from 1 to, at most, 4 (at most 2 to one phenolic unit) as bonded to two phenolic units.
Figure 5:
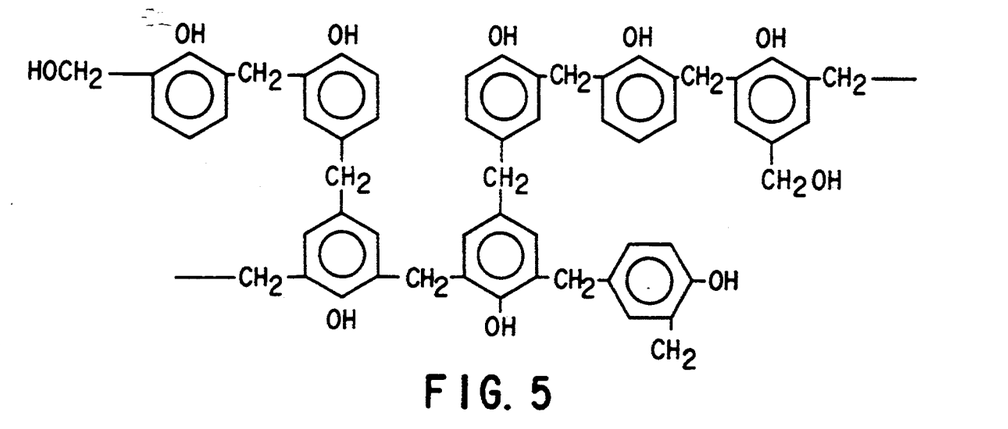
FIG. 5 shows the presumed chemical structure of Bell pearl S.
Figure 6:
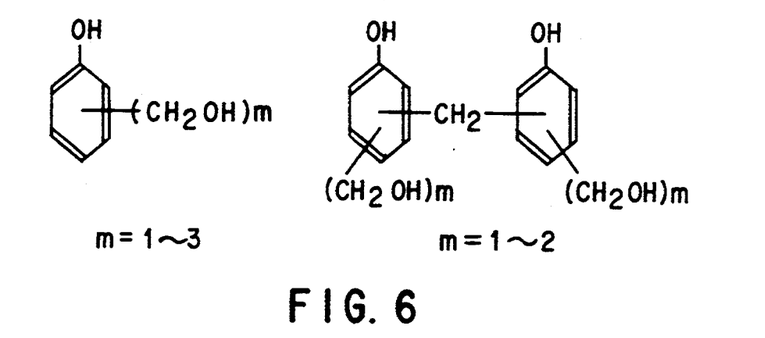
FIG. 6 shows the chemical structure of a non-hardened conventional novolak.
Figure 7:
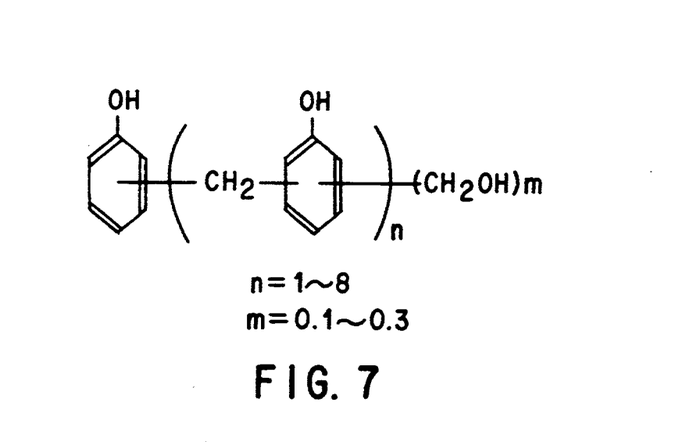
FIG. 7 shows the chemical structure of non-hardened conventional resol.

FIG. 1, FIG. 2 and FIG. 3 each show the molecular weight distribution curve thus obtained. For reference, some resol type models are shown in FIGS. 4(a), 4(b) and 4(c), which indicate addition of methylol groups to the phenolic unit of the constitutive unit of a phenolic resin. FIG. 5 shows a presumed chemical structure of Bell pearl S as used in the examples. FIG. 6 shows a chemical structure of an ordinary novolak type phenolic resin; and FIG. 7 shows a chemical structure of an ordinary resol type phenolic resin.

Bell pearl S is a high molecular resin having a suitable methylol content (in such a degree that hardening of the resin is not too rapid nor too slow) and having a free phenol content of substantially nearly 0 (less than 0.1%). It is remarkably different from an ordinary phenolic resin with respect to its high stability (having an extremely long life without blocking). Employment of this as a binder has brought about the completion of the present invention.

Next, examples of applying refractory granules as formed by the so-called aqueous kneading granulation of a refractory composition containing the binder of the present invention along with water under heat to formation of a gas-permeable part of a casting nozzle are shown in Table 3 below along with comparative examples.

TABLE 3

| | Comp. Ex. 1 | Comp. Ex. 2 | Comp. Ex. 3 | Comp. Ex. 4 | Comp. Ex. 5 | Comp. Ex. 6 | Ex. 1 | Ex. 2 | Comp. Ex. 7 | Ex. 3 |
|---|---|---|---|---|---|---|---|---|---|---|
| Refractory Components (wt. %) | | | | | | | | | | |
| Grains of Alumina | 49 | 49 | 49 | 49 | 49 | 49 | 49 | 49 | 67 | 67 |
| Fine Grains of Silicon Carbide | 5 | 5 | 5 | 5 | 5 | 5 | 5 | 5 | 4 | 4 |
| Fine Grains of Silicon | 1 | 1 | 1 | 1 | 1 | 1 | 1 | 1 | 1 | 1 |
| Fine grains of Zirconia Mullite | — | — | — | — | — | — | — | — | — | — |
| Fine Grains of Spinel | — | — | — | — | — | — | — | — | — | — |
| Fine Grains of CaO-Stabilized Zirconia | — | — | — | — | — | — | — | — | — | — |
| Fine Grains of Calcium Zirconate | — | — | — | — | — | — | — | — | — | — |
| Fine Grains of Molten Silica | 25 | 25 | 25 | 25 | 25 | 25 | 25 | 25 | — | — |
| Natural Flaky Graphite | 20 | 20 | 20 | 20 | 20 | 20 | 20 | 20 | 28 | 28 |
| Content of Phenolic Resin (wt. %) | +11 | +11 | +11 | +11 | +11 | +11 | +11 | +11 | +9 | +9 |
| ○ Characteristics of Phenolic Resin | | | | | | | | | | |
| Kind of Phenolic Resin(*1) | A | A | D | D | D | D | D | D | A | D |
| Number of Methylol Groups (n/phenolic unit) | 0.02 | 0.02 | 0.25 | 0.25 | 0.03 | 0.8 | 0.25 | 0.25 | 0.02 | 0.25 |
| Free Phenol (wt. %) | 3.0 | 3.0 | 6.0 | <0.1 | <0.1 | <0.1 | <0.1 | 3.0 | 3.0 | <0.1 |
| Use of Hardening Agent | Yes | Yes | No | No | No | No | No | No | Yes | No |
| Heating in Granulation | No | Yes | Yes | No | Yes | Yes | Yes | Yes | No | Yes |
| Safety (against firing) | X | ○ | ○ | ○ | ○ | ○ | ○ | ○ | X | ○ |
| Toxicity (due to vaporization of solvent and low boiling component) | Δ | ○ | X | ○ | ○ | ○ | ○ | ○ | Δ | ○ |
| Solvent in Kneading Granulation(*2) | A | B | B | B | B | B | B | B | A | B |
| Quality of Fired Article | | | | | | | | | | |
| Bulk Density | 2.26 | 2.10 | 2.23 | 2.13 | 2.04 | 2.24 | 2.19 | 2.17 | 2.44 | 2.42 |
| Apparent Porosity (%) | 18.5 | 23.5 | 18.9 | 22.0 | 25.4 | 19.0 | 19.3 | 19.5 | 17.6 | 18.0 |
| Bending Strength at Room Temperature (kg/cm$^2$) | 64 | 38 | 65 | 40 | 30 | 64 | 68 | 64 | 54 | 54 |
| Hot Bending Strength at 1400° C. (kg/cm$^2$) | 60 | 34 | 64 | 38 | 30 | 60 | 65 | 60 | 56 | 56 |
| Spalling Test(*3) | Not cracked | Cracked Greatly | Not cracked | Cracked Greatly | Cracked Greatly | Not cracked | Not cracked | Not cracked | Not cracked | Not cracked |
| Melt Loss Index(*4) | 100 | 130 | 100 | 120 | 150 | 100 | 90 | 100 | 60 | 56 |
| Aeration Stability(*5) | X | X | Δ | X | X | Δ | ○ | ○ | X | ○ |

(*1)A: Ordinary novolak, B: High molecular novolak, C: ordinary resol, D: Self-hardening high molecular phenol
(*2)A: Non-aqueous solvent (lower alcohol), B: Water (H$_2$O)
(*3)A sample of a determined shape was dipped in molten iron of 1600° C. for 90 seconds and then cooled for 20 seconds, whereupon the condition of the sample was observed with respect to cracks, if any.
(*4)2.5 kg of electrolytic iron and 62.5 g of the slug (CaO/SiO$_2$ = 2) were dipped in molten steel of 1600° C. for 60 minutes, whereupon the reduction of the dimension of the slug/metal interface was measured. The measured value was represented as an index based on the value of Comparative Example 1 of being 100.
(*5)○: 90% or more of the tested samples were within the acceptable gas-permeable range (30 to 40 NL/min) as the yield standard.
Δ: 60% or less of the tested samples were within the acceptable gas-permeable range (30 to 40 NL/min) as the yield standard.
X: 40% or less of the tested samples were within the acceptable gas-permeable range (30 to 40 NL/min) as the yield standard.

An ordinary phenolic resin of a prior art or a high molecular phenolic resin of the present invention was added, as a binder, to the refractory composition comprising the components shown in Table 3 above to prepare shaping compositions. Each of the compositions was shaped with an isostatic press, dried and then fired to obtain an immersion nozzle.

Comparative Example 1 demonstrates formation of a gas-permeable article, using an ordinary novolak phenolic resin by a prior art. The articles formed do not satisfy the acceptable gas-permeable range (30 to 40 NL/min). In addition, since a low boiling point solvent was used, the process involves problems with respect to both safety and toxicity.

Comparative Example 2 demonstrates aqueous granulation with an ordinary novolak type phenolic resin, where the binder used was partially hardened during kneading under heat so that refractory granules applicable to isostatic pressing could not be obtained. The shaped article from the composition had a low mechanical strength and cracked during firing. Thus, the yield of the shaped articles was low.

Comparative Example 3 employed a high molecular phenolic resin, in which the number of the methylol groups was within the claimed range but the free phenol content was 6% and was outside the claimed range. Since the free phenol content in the binder resin was large, the yield of the shaped articles was low and the articles formed do not satisfy the acceptable gas-permeable range. Although the process did not use a solvent, it involves a problem with respect to toxicity because of the high free phenol content.

Comparative Example 4 employed a binder of the present invention. However, since the granulation was not effected by kneading under heat, the binder could not display its function during granulation. As a result, the articles formed had a low mechanical strength and were highly porous, and the yield of the articles was poor.

Comparative Example 5 employed a binder resin in which the number of the methylol groups was 0.03 per one phenolic unit and was outside the claimed range. As the hardening rate of the composition was extremely low and the hardening of the composition was insufficient, the hardened articles had a low mechanical strength and were highly porous, and they do not satisfy the acceptable gas-permeable range.

Comparative Example 6 employed a binder resin in which the number of the methylol groups was 0.03 per one phenolic unit and was outside the claimed range. The property of the composition varied with the lapse of time. The yield of the shaped articles was low and the articles formed do not satisfy the acceptable gas-permeable range.

Comparative Examples 1 to 6 each employed an alumina/carbon composition (containing $SiO_2$). Comparative Example 7 employed an alumina/carbon composition (not containing $SiO_2$), which was processed by a prior art process. In these comparative examples, gas-permeable articles were formed from the respective compositions but none satisfy the acceptable gas-permeable range. In addition, they involve problems with respect to both safety and toxicity.

Examples 1 and 2 each demonstrate aqueous granulation of a refractory alumina/carbon composition containing $SiO_2$ and containing a high molecular phenolic resin of the present invention. The gas-permeable articles formed from the compositions satisfy the acceptable gas-permeable range, unlike those formed in Comparative Examples 1 to 6. In addition, since the granulation was effected in the presence of water, it was safe (with no danger of fire, because of the non-solvent system) and was free from the danger of toxicity (as the free phenol content in the binder used was almost 0). The aqueous granulation process is the cleanest one, in terms of environmental pollution, as any process considered to be practically employable at present. The effect of the present invention is thus obvious from these examples.

Example 3 employed an alumina/carbon composition (containing $SiO_2$). The process as employed herein for processing the composition is also a clean process, like the process of Examples 1 and 2, and it verified the effect of the present invention.

A gas-permeable immersion nozzle as produced in Example 1 was actually used in a plant having a 130-ton pan, in O Factory of A Steelworks Co. It was verified that the nozzle of Example 1 could be used quite as well as to the ordinary nozzles currently used in the plant.

Next, examples of applying refractory granules as formed by so-called aqueous kneading granulation of a refractory composition containing the binder of the present invention along with water in a kneading mixer under heat followed by controlling the volatile content in the resulting mix in the mixer also under heat to a shapable level, to formation of a gas-permeable part of a casting nozzle are shown in Table 4 below along with comparative examples.

TABLE 4

|  | Comp. Ex. 1 | Comp. Ex. 2 | Comp. Ex. 3 | Comp. Ex. 4 | Comp. Ex. 5 | Comp. Ex. 6 | Ex. 1 | Ex. 2 | Comp. Ex. 7 | Ex. 3 |
|---|---|---|---|---|---|---|---|---|---|---|
| Refractory Components (wt. %) | | | | | | | | | | |
| Grains of Alumina | 49 | 49 | 49 | 49 | 49 | 49 | 49 | 49 | 67 | 67 |
| Fine Grains of Silicon Carbide | 5 | 5 | 5 | 5 | 5 | 5 | 5 | 5 | 4 | 4 |
| Fine Grains of Silicon | 1 | 1 | 1 | 1 | 1 | 1 | ·1 | 1 | 1 | 1 |
| Fine grains of Zirconia Mullite | — | — | — | — | — | — | — | — | — | — |
| Fine Grains of Spinel | — | — | — | — | — | — | — | — | — | — |
| Fine Grains of CaO-Stabilized Zirconia | — | — | — | — | — | — | — | — | — | — |
| Fine Grains of Calcium Zirconate | — | — | — | — | — | — | — | — | — | — |
| Fine Grains of Molten Silica | 25 | 25 | 25 | 25 | 25 | 25 | 25 | 25 | — | — |
| Natural Flaky Graphite | 20 | 20 | 20 | 20 | 20 | 20 | 20 | 20 | 28 | 28 |
| Content of Phenolic Resin (wt. %) | +11 | +11 | +11 | +11 | +11 | +11 | +11 | +11 | +9 | +9 |
| ◯ Characteristics of Phenolic Resin | | | | | | | | | | |
| Kind of Phenolic Resin(*1) | A | A | D | A | D | D | D | D | A | D |
| Number of Methylol Groups (n/phenolic unit) | 0.02 | 0.02 | 0.25 | 0.02 | 0.03 | 0.8 | 0.25 | 0.25 | 0.02 | 0.25 |
| Free Phenol (wt. %) | 3.0 | 3.0 | 6.0 | 3.0 | <0.1 | <0.1 | <0.1 | 3.0 | 3.0 | <0.1 |
| Use of Hardening Agent | Yes | Yes | No | Yes | No | No | No | No | Yes | No |
| Heating in Granulation | No | Yes | Yes | No | Yes | Yes | Yes | Yes | No | Yes |
| Drying in Mixer | No | Yes | Yes | Yes | Yes | Yes | Yes | Yes | No | Yes |
| Energy-Saving in Controlling of Volatile Content | No | Yes | Yes | Yes | Yes | Yes | Yes | Yes | No | Yes |
| Safety (against firing) | X | X | ◯ | X | ◯ | ◯ | ◯ | ◯ | X | ◯ |
| Toxicity (due to vaporization of solvent and low boiling component) | Δ | ◯ | X | Δ | ◯ | ◯ | ◯ | ◯ | Δ | ◯ |

TABLE 4-continued

|  | Comp. Ex. 1 | Comp. Ex. 2 | Comp. Ex. 3 | Comp. Ex. 4 | Comp. Ex. 5 | Comp. Ex. 6 | Ex. 1 | Ex. 2 | Comp. Ex. 7 | Ex. 3 |
|---|---|---|---|---|---|---|---|---|---|---|
| Solvent in Kneading-Granulation(*2) | A | B | B | A | B | B | B | B | A | B |
| Quality of Fired Article | | | | | | | | | | |
| Bulk Density | 2.26 | 2.13 | 2.25 | 2.15 | 2.04 | 2.20 | 2.19 | 2.18 | 2.44 | 2.42 |
| Apparent Porosity (%) | 18.5 | 24.6 | 19.6 | 23.9 | 25.4 | 19.0 | 19.3 | 19.7 | 17.6 | 18.0 |
| Bending Strength at Room Temperature (kg/cm$^2$) | 64 | 36 | 65 | 40 | 30 | 68 | 65 | 64 | 54 | 54 |
| Hot Bending Strength at 1400° C. (kg/cm$^2$) | 60 | 35 | 62 | 38 | 30 | 65 | 60 | 62 | 56 | 54 |
| Spalling Test(*3) | Not cracked | Cracked Greatly | Not cracked | Cracked Greatly | Cracked Greatly | Cracked Greatly | Not cracked | Not cracked | Not cracked | Not cracked |
| Melt Loss Index(*4) | 100 | 130 | 100 | 120 | 150 | 100 | 100 | 100 | 60 | 56 |
| Aeration Stability(*5) | X | X | Δ | Δ | X | Δ | ○ | ○ | X | ○ |

(*1)A: Ordinary novolak, B: High molecular novolak, C: ordinary resol, D: Self-hardening high molecular phenol
(*2)A: Non-aqueous solvent (lower alcohol), B: Water + High boiling point solvent
(*3)A sample of a determined shape was dipped in molten iron of 1600° C. for 90 seconds and then cooled for 20 seconds, whereupon the condition of the sample was observed with respect to cracks, if any.
(*4)2.5 kg of electrolytic iron and 62.5 g of the slug (CaO/SiO$_2$ = 2) were dipped in molten steel of 1600° C. for 60 minutes, whereupon the reduction of the dimension of the slug/metal interface was measured. The measured value was represented as an index based on the value of Comparative Example 1 of being 100.
(*5)○: 90% or more of the tested samples were within the acceptable gas-permeable range (30 to 40 NL/min) as the yield standard.
Δ: 60% or less of the tested samples were within the acceptable gas-permeable range (30 to 40 NL/min) as the yield standard.
X: 40% or less of the tested samples were within the acceptable gas-permeable range (30 to 40 NL/min) as the yield standard.

An ordinary phenolic resin of a prior art or a high molecular phenolic resin of the present invention was added, as a binder, to the refractory composition comprising the components shown in Table 4 above to prepare shaping compositions. Each of the compositions was shaped with an isostatic press, dried and then fired to obtain an immersion nozzle.

Comparative Example 1 demonstrates formation of a gas-permeable article, using an ordinary novolak phenolic resin by a prior art. The articles formed do not satisfy the acceptable gas-permeable range (30 to 40 NL/min). In addition, since a low boiling point solvent was used, the process involves problems with respect to both safety and toxicity.

Comparative Example 2 demonstrates aqueous granulation with an ordinary novolak type phenolic resin binder in a kneading mixer followed by adjustment of the volatile content of the resulting refractory granules in the mixer, where the binder used was partially hardened during kneading under heat followed by adjustment of the volatile content in the granules so that the refractory granules formed were not ones applicable to isostatic pressing. The shaped article from the granules had a low mechanical strength and cracked during firing. Thus, the yield of the shaped articles was low.

Comparative Example 3 employed a high molecular phenolic resin in which the number of the methylol groups was within the claimed range but the free phenol content was 6% and was outside the claimed range. Since the free phenol content in the binder resin was high, the yield of the shaped articles was low and the articles formed do not satisfy the acceptable gas-permeable range. Although the process did not use a solvent, it involves a problem with respect to toxicity because of the high free phenol content.

Comparative Example 4 demonstrates formation of refractory granules in a mixer in accordance with a prior art process using an ordinary novolak phenolic resin binder followed by drying the granules in the mixer. In the process, since the phenolic resin binder was dissolved in the alcohol used, the adjustment of the volatile content in the granules required an extremely long period of time. Depending upon the residual volatile content remaining in the granules, much more time would often be needed for the adjustment of the volatile content. Therefore, the phenolic resin binder used was partially hardened during the process so that the surfaces of the granules were also partially hardened in such a condition that the granules were coated with the hardened binder. Under these conditions, vaporization of the volatile content from the inside of the granules is inhibited and, in fact, satisfactory adjustment of the volatile content in the granules is impossible. In any case, refractory granules applicable to isostatic pressing could not be obtained. The shaped article from the granules obtained had a low mechanical strength and cracked during firing. Thus, the yield of the shaped articles was low.

Comparative Example 5 employed a binder resin in which the number of the methylol groups was 0.03 per one phenolic unit and was outside the claimed range. As the hardening rate of the composition was extremely low and hardening of the composition was insufficient, the hardened articles had a low mechanical strength and were highly porous, and they do not satisfy the acceptable gas-permeable range. The granules formed by the aqueous granulation could not satisfy a predetermined necessary general quality. If the granules are dried in a mixer, they are often broken so that the article shaped from them has a greatly lessened mechanical strength.

Comparative Example 6 employed a binder resin in which the number of the methylol groups was 0.8 per one phenolic unit and was outside the claimed range. The property of the composition somewhat varied with the lapse of time. The yield of the shaped articles was low and the articles formed do not satisfy the acceptable gas-permeable range.

However, the granules formed by the aqueous granulation had the necessary general quality. In addition, they involved no problem with respect to either safety or toxicity. Thus, the process of producing the granules is a so-called clean process. In this process, adjustment of the volatile content in the granules was possible but the gas-permeability of the articles from the granules was not uniform.

Comparative Examples 1 to 6 each employed an alumina/carbon composition (containing SiO$_2$). Comparative Example 7 employed an alumina/carbon composition (not containing SiO$_2$), which was processed by prior art process. In these comparative examples, gas-permeable articles were formed from the respective compositions but none satisfy the acceptable gas-permeable range. In addition, they involved problems with respect to both safety and toxicity.

Examples 1 and 2 each demonstrate aqueous granulation of a refractory alumina/carbon composition containing SiO$_2$ and containing a high molecular phenolic resin of the present invention. The gas-permeable articles formed from the compositions satisfy the acceptable gas-permeable range, unlike those formed in Comparative Examples 1 to 6. In addition, since the granulation was effected in the presence of water, it was safe (with no danger of fire, because of the non-solvent system) and was free from toxicity (as the free phenol content in the binder used was almost nearly to 0). The aqueous granulation process is the cleanest one, in terms of environmental pollution, as any process which is considered to be practically employable at present. In addition, adjustment of the volatile content in the granules may be effected in the kneading mixer in accordance with the process, which is an epoch-making process. This process is highly advantageous in terms of energy-savings.

Example 3 employed an alumina/carbon composition (containing SiO$_2$). The process as employed herein for processing the composition is also a clean process, like the process of Examples 1 and 2, and it verified the effect of the present invention.

Examples 1 to 3 employed a high molecular phenolic resin binder of the present invention. Since the resin binder has excellent thermal stability because of its chemical structure (having a few methylol groups so that the resin is hardened gently), it is not partially hardened under heat during granulation and during drying for adjustment of the volatile content in the granules. It has been found that the binder is useful in such a clean and energy-saving process.

A gas-permeable immersion nozzle as produced in Example 1 was actually used in a plant having a 130-ton pan, in O Factory of A Steelworks Co. It was verified that the nozzle of Example 1 could be used quite as well as the ordinary nozzles currently used in the plant.

The present invention displays the following effects.

(1) In granulation of refractory aggregates by the invention, a low boiling point solvent is not used. Therefore, preparation of the binder for the invention is simple, and the step of drying the granules may be omitted. The invention greatly contributes to the effective utilization of natural resources and to the improved efficiency of refractories.

(2) The binder of the invention is self-hardening but is barely hardened at 130° C. or lower. It is plasticized under heat in a mixer to display effect as a binder. Water may be used in place of a low boiling point solvent for granulation of refractory aggregates with the binder of the invention. Due to the barely hardening property, the binder withstands the dry condition in a mixer.

(3) As the invention does not use a low boiling point solvent, it is free from the problems of toxicity and the danger of fire.

(4) Since the binder of the invention comprises a phenolic polymer having a much reduced free phenol content, the process of using the binder is free from human toxicity and environmental pollution.

(5) Since the binder of the invention comprises a phenolic polymer having a much reduced free phenol content and is a self-hardening one which does not need a hardening agent because of the chemical structure, the amount of gas generated during its use may be reduced. The yield in shaping, hardening and firing large-size and thick-wall casting nozzles from the refractory granules produced by the invention is improved.

(6) Variation of the plasticity of the binder due to fluctuation of the ambient temperature and humidity with the lapse of time is reduced. Therefore, where the refractory granules produced by the invention are applied to shaping of gas-permeable articles, the stability of the gas-permeability of the articles is high. The yield in producing nozzles for continuous casting from the refractory granules is greatly improved.

While the invention has been described in detail and with reference to specific embodiments thereof, it will be apparent to one skilled in the art that various changes and modifications can be made therein without departing from the spirit and scope thereof.

What is claimed is:

1. A phenol-formaldehyde resin binder for refractories, having a methylol content of from 0.05 to 0.6 on average per one phenolic unit and having a free phenol content of less than 5%.

2. A method of producing refractory granules comprising:
   adding a mixture comprising a phenol-formaldehyde resin binder having a methylol content of 0.05 to 0.6 on average per one phenolic unit and having a free phenol content of less than 5% and water to a refractory composition comprising carbonaceous substances of 50% by weight or less as a whole and a balance of refractory materials; and
   kneading the resulting mixture in a mixer heated at a temperature of 60° to 130° C. for obtaining refractory granules.

3. A method of producing refractory granules comprising:
   mixing a phenol-formaldehyde resin binder having a methylol content of 0.05 to 0.6 on average per one phenolic unit and having a free phenol content of less than 5%, water and a solvent having a boiling point of 200° C. or higher; adding the mixture to a refractory composition comprising carbonaceous substances of 50% by weight or less as a whole and a balance of refractory materials;
   kneading the resulting mixture in a mixer heated at a temperature of 60° to 130° C. for obtaining refractory granules; and
   adjusting a volatile content of the resulting refractory granules to a shapable level in the mixer.

4. A method according to claim 2, wherein said refractory materials comprise at least one material selected from the group consisting of $Al_2O_3$, $SiO_2$, $ZrO_2$, CaO and MgO.

5. A method according to claim 2, wherein said carbonaceous substance is at least one selected from the group consisting of graphite, coke, mesophase carbon, isotropic carbon and carbon black.

6. A method according to claim 2, wherein an amount of the binder is 7-11 wt. %.

7. A method according to claim 3, wherein an amount of the binder is 7-11 wt. %.

8. A method according to claim 3, wherein said refractory materials comprise at least one material selected from the group consisting of $Al_2O_3$, $SiO_2$, $ZrO_2$, CaO and MgO.

9. A method according to claim 3, wherein said carbonaceous substance is at least one selected from the group consisting of graphite, coke, mesophase carbon, isotropic carbon and carbon black.

10. A mixture of a phenol-formaldehyde resin binder and a refractory material, said binder having a methylol content of from 0.05 to 0.6 on average per one phenolic unit and having a free phenol content of less than 5%, said refractory material comprising at least one material selected from the group consisting of $Al_2O_3$, $SiO_2$, $ZrO_2$, CaO and MgO.

* * * * *